United States Patent
Junqueira et al.

(10) Patent No.: US 9,652,334 B2
(45) Date of Patent: May 16, 2017

(54) INCREASING COORDINATION SERVICE RELIABILITY

(71) Applicant: Microsoft Technology Licensing, LLC, Redmond, WA (US)

(72) Inventors: Flavio Paiva Junqueira, Cambridge (GB); Johannes Klein, Sammamish, WA (US); Satish R. Thatte, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 14/609,323

(22) Filed: Jan. 29, 2015

(65) Prior Publication Data

US 2016/0224432 A1    Aug. 4, 2016

(51) Int. Cl.
*G06F 11/00* (2006.01)
*G06F 11/14* (2006.01)
(Continued)

(52) U.S. Cl.
CPC ............ *G06F 11/1464* (2013.01); *G06F 8/65* (2013.01); *G06F 8/71* (2013.01); *G06F 11/1451* (2013.01); *H04L 67/1097* (2013.01); *H04L 67/16* (2013.01); *G06F 2201/805* (2013.01); *G06F 2201/815* (2013.01); *G06F 2201/82* (2013.01)

(58) Field of Classification Search
CPC ............ G06F 11/1464; G06F 11/1451; H04L 67/1097; H04L 67/16
See application file for complete search history.

(56) References Cited

U.S. PATENT DOCUMENTS 6,615,225 B1 * 9/2003 Cannon ............... G06F 11/1453
7,685,171 B1 * 3/2010 Beaverson .......... G06F 11/1451
                                                           707/999.202

(Continued)

OTHER PUBLICATIONS

Ongaro, et al, "In Search of an Understandable Consensus Algorithm", In Proc. ATC '14, USENIX Annual Technical Conference (2014), First Published on: May 20, 2014, pp. 18.

(Continued)

*Primary Examiner* — Philip Guyton
(74) *Attorney, Agent, or Firm* — Dodd Law Group; Michael B. Dodd

(57) ABSTRACT

The present invention extends to methods, systems, and computer program products for increasing coordination service reliability. A coordination service maintains state (e.g., using replication) for one or more software components (e.g., applications). Tokens can be used to identify incarnations of a member set within the coordination service. When a member starts and has no token, the member attempts to learn the token from a majority other members. If no such token exists, the member requests a new token. Aspects of the invention can be used to detect and compensate for lost state within the coordination service, including state lost due to storage device failures (which may be referred to as "silent data loss"). Detecting and compensating for silent data loss makes the coordination service more reliable and can essentially guarantee that the coordination service notifies clients when data is lost and ceases processing when incorrect state may exist.

27 Claims, 6 Drawing Sheets

(51) Int. Cl.
    *H04L 29/08*     (2006.01)
    *G06F 9/445*     (2006.01)
    *G06F 9/44*     (2006.01)

(56) References Cited

U.S. PATENT DOCUMENTS

| | | |
|---|---|---|
| 8,103,635 B2 | 1/2012 | Lee et al. |
| 9,317,369 B2 * | 4/2016 | Freedman ............ G06F 11/1402 |
| 2008/0091805 A1 * | 4/2008 | Malaby ............... H04L 67/1097 |
| | | 709/223 |
| 2011/0313973 A1 | 12/2011 | Srivas et al. |
| 2012/0271926 A1 | 10/2012 | Shakirzyanov et al. |
| 2014/0188825 A1 | 7/2014 | Muthukkaruppan et al. |

OTHER PUBLICATIONS van Renesse, et al, "Vive La Difference: Paxos vs. Viewstamped Replication vs. Zab", Dependable and Secure Computing, IEEE Transactions (vol. PP, Issue 99), Published on: Sep. 8, 2014, pp. 13.

\* cited by examiner

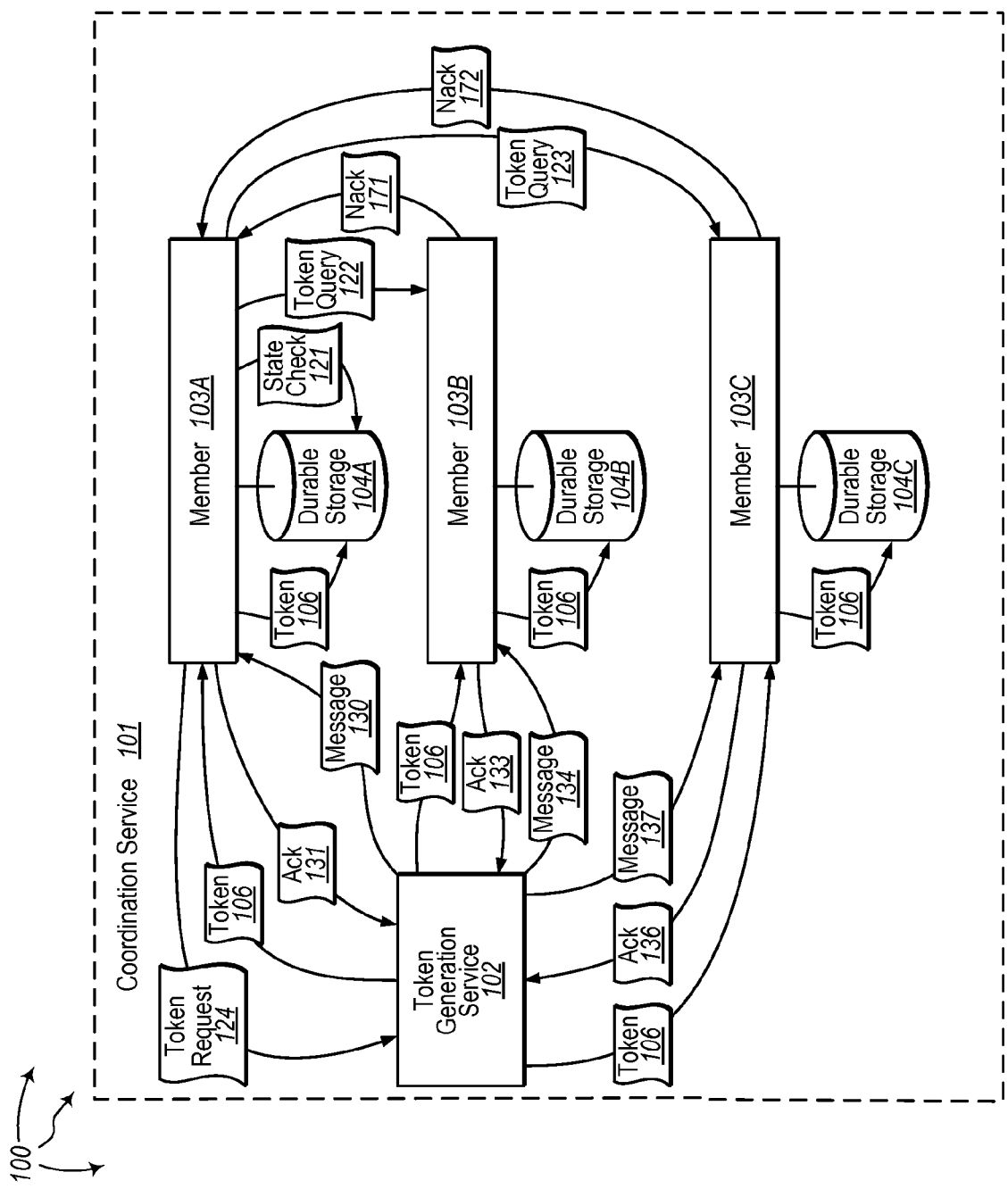

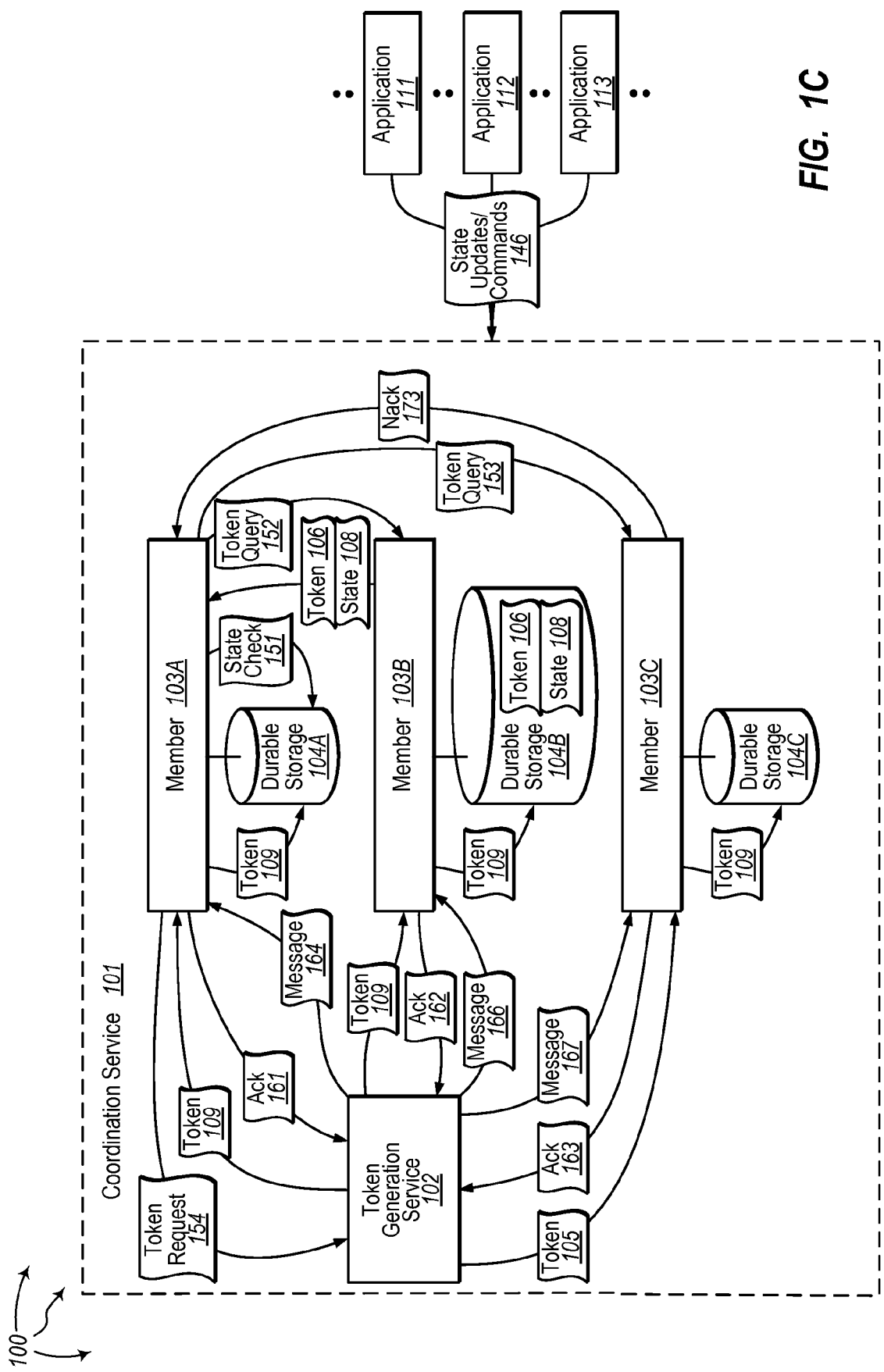

INCREASING COORDINATION SERVICE RELIABILITY

CROSS-REFERENCE TO RELATED APPLICATIONS

Not Applicable

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems In some environments, components of different distributed applications can interoperate with one another. It may also be that multiple copies of the same distributed application operate in parallel. In these environments, commands and/or state for the distributed applications have to be maintained in case a distributed application or component thereof fails. If a distributed application component malfunctions, commands and/or state for the distributed application can be lost.

Unfortunately, many distributed applications are designed with limited state management capabilities. These limited state management capabilities may be able to recover commands and/or state in standalone or other relatively simple operating environments. However, these limited state management capabilities are often not robust enough to recover commands and/or state in more complex operating environments (where the possibility of loss also increases).

As such, a separate centralized coordination service can be used for maintaining distributed application state (e.g., maintaining configuration information, naming, providing distributed synchronization, and providing group services). Coordination services can include multiple nodes and use replication to help insure that distributed application state is not lost. Coordination services can use active replication or passive replication to replicate state among multiple nodes in accordance with a consensus protocol. In active replication, each coordination service node performs an application command and generates state updates. When consensus is reached on generated results, the generated results are stored at each node (including replication of generated results to any minority nodes). In passive replication, a primary node performs an application command and proposes state updates to other nodes. When consensus is reached on proposed results, the proposed results are replicated to and stored at the other nodes.

Many consensus protocols rely on the notion of quorums. A commonly used quorum is a majority quorum. Using a quorum, when a majority of coordination service nodes agree on a proposed value, the value is declared successful and is locked for replication to all coordination service nodes. Requiring consensusenables progress even if a minority of coordination service nodes crash. Use of a majority quorum also increases consistency since any two majorities intersect on at least one coordination service node by definition. This intersection property guarantees that any majority has at least one coordination service node that has observed all successfully replicated state updates.

Consensus protocols typically assume that nodes can crash and recover. Consequently, the consensus protocol at the core of the service needs to behave correctly under this assumption. Replication is deemed successful when a node has persisted application state to a storage device (e.g., a mechanical disk, a Solid State Drive (SSD), etc.) providing more durable storage. Storing application state to more durable storage (versus more volatile memory, such as, RAM) provides assurances that replicated application state is maintained at a majority of coordination service nodes after a node crash.

However, even more durable types of storage are not free from faults. A fault in durable storage can cause a coordination service node to lose replicated application state that the coordination service node previously acknowledged as being stored. Thus, when the coordination service node restarts, there may not be a majority of coordination service nodes in agreement with respect to application state. Further, in a virtualized environment, a durable storage failure can be caused due to restarting process in a different server. The restart is automated and there are no mechanisms in place to prevent data loss.

For example, a coordination service may include nodes A, B, and C. Nodes A and B may form a quorum and replicate state update x. Subsequently, node B may be subject to a durable storage failure resulting in the loss of state update x. Due to the durable storage failure, node B can be manually removed from and then manually reintroduced into the coordination service. After reintroduction, node B forms a quorum with node C prior to communication with node A. Nodes B and C decide that no state updates have been replicated. Node B and C then successfully replicate state update y. Thus, state update x is lost even though state update x had been successfully replicated.

Unfortunately, loss of state update x can be difficult to detect (and may be referred to as "silent data loss"). Applications using the coordination service may be unaware that state update x was lost. The applications may proceed on the knowledge that state update x was successfully replicated. Further, as long as the applications appear to be operating as intended, technical personnel administering the applications and/or coordination service may have no way to know that state update x was lost. Even after applications begin to malfunction due to the loss of state update x, investigating technical personnel have to consider many potential reasons and may not immediately identify loss of state update x as the reason. As applications operate for longer periods of time prior to exhibiting malfunctions, identifying loss of state update x as the reason can be even more difficult.

BRIEF SUMMARY

The present invention extends to methods, systems, and computer program products for increasing coordination service reliability. A coordination service maintains state (e.g., using replication) for one or more software components. The coordination service includes a number of interoperating members that replicate state between one another. Replicating state between the interoperating members increases the likelihood that the state is available when a member fails.

When a member is (re)started, the member determines that it does not include state for the one or more software components by detecting that there is no token for the coordination service stored in durable storage of the member. The member sends a token query message to any of the other members it can reach. In response to the token query message, the member may receive an acknowledgment of token possession from more than half of the number of other members (i.e., a quorum of AKCs). The member can also access corresponding state stored at the majority of the plurality of other members. If so, the member determines that other members agree on a token and replicates the corresponding state by storing the corresponding state and the token in the durable storage of the member. The member reintegrates into the coordination service subsequent to replicating the corresponding state in the durable storage of the member.

On the other hand, in response to the token query message, the member may receive a negative acknowledgement of token possession from more than half of the number of other members (i.e., a quorum of NACKs). If so, the member determines that other members do not agree on the token. The member sends a token request message to a designated token distributor in response to the determination. The token request message requests that the designated token distributor establish a new token for the coordination service.

The member receives the new token from the designated token distributor. The member stores the new token in durable storage of the member. The member sends an acknowledgment to the designated token distributor acknowledging receipt of the new token. The member receives a further message from the designated token distributor indicating that at least half of the number of other members has also acknowledged receipt of the new token. The member reintegrates into the coordination service subsequent to installing the new token.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only some implementations of the invention and are not therefore to be considered to be limiting of its scope, the invention will be described and explained with additional specificity and detail through the use of the accompanying drawings in which:

FIGS. 1A-1C illustrate an example computer architecture for increasing coordination service reliability.

DETAILED DESCRIPTION

Figure 1B:
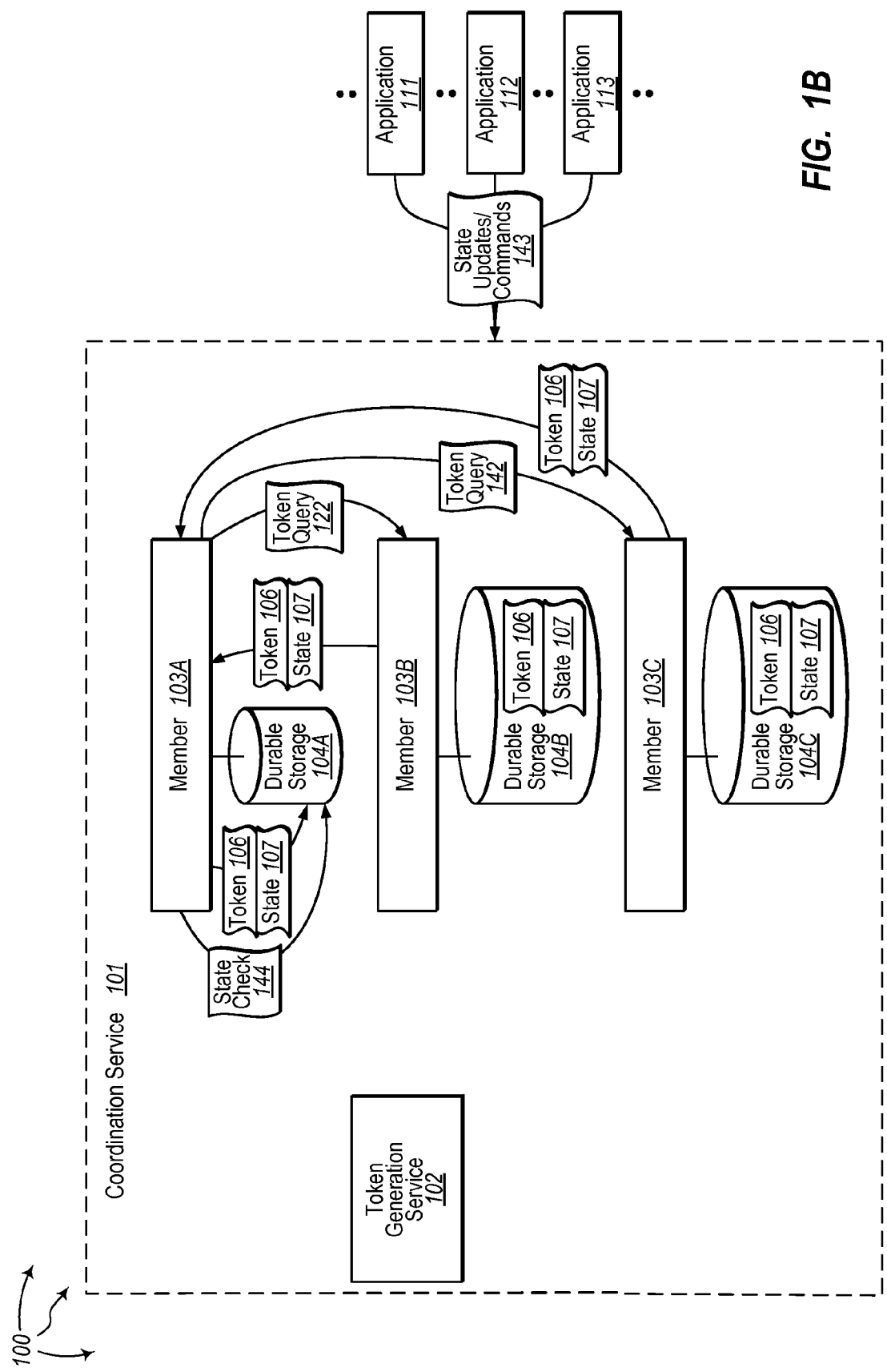

The present invention extends to methods, systems, and computer program products for increasing coordination service reliability. A coordination service maintains state (e.g., using replication) for one or more software components (e.g., applications). Aspects of the invention can be used to detect and compensate for state loss within the coordination service, including state lost due to storage device failures (which may be referred to as "silent data loss"). Detecting and compensating for silent data loss makes the coordination service, as well as communication between the one or more software components, more reliable by significantly increasing the likelihood that either correct state is passed back to the one or more software components or loss of data is detected and the one or more software components are appropriately notified.

During restart, a member of a coordination service can detect whether data loss has occurred. When data loss is not detected, the member can attempt to rejoin the coordination service. When data loss is detected, the member can recover from data loss by obtaining state and a token from, for example, a majority of other members of the coordination service. After recovery, the member can attempt to rejoin the coordination service. Using tokens to detect and compensate for silent data loss during restart reduces the likelihood of inconsistent and/or incorrect state propagating out to the one of more software components and also reduces the time that inconsistent and/or incorrect state may persist within the coordination service. In turn, the likelihood of software component errors (e.g., data corruption) due to propagation of inconsistent and/or incorrect state is also reduced.

In one aspect, the invention provides hard guarantees that correct state is passed back to applications or loss of data is detected and applications are notified. In another aspect, the invention provides hard guarantees that a member rejoins a coordination service only after it is determined that no data loss has occurred or that the member has recovered through communication with other members. However, less rigid conditions can also be used.

The coordination service includes a plurality of (e.g., 3 or more) interoperating members that replicate state between one another. Replicating state between the plurality of members increases the likelihood that the state is available when a member fails.

The plurality of members can include a member and a number of (e.g., 2 or more) other members. When the member is (re)started, the member determines that it does not include state for the one or more software components by detecting that there is no token for the coordination service stored in durable storage of the member. In one aspect, the member is started (along with the number of other members) during initialization of the coordination service. In another aspect, the member is restarted (e.g., after a crash) when less than half of the number of other members are operating as intended. Thus, in this other aspect, more than half (but not necessarily all) of the other members may be undergoing restart at or near the same time. In a further aspect, the member is restarted (e.g., after a crash) when more than half of number of other members are operating as intended. Subsequent to start or restart, the member sends a token query message to any of the number of other members that can be reached.

In response to the token query message, the member may receive an acknowledgment of token possession (e.g., an ACK) from more than half of the number of other members. The member can also access corresponding state stored at any member that responds with a token acknowledgement. If so, the member replicates the corresponding state by storing the corresponding state and the token in the durable storage of the member. The member reintegrates into the coordination service subsequent to replicating the corresponding state in the durable storage of the member.

On the other hand, in response to the token query message, the member may receive a negative acknowledgement (e.g., a NACK) of token possession from more than half of the number of other members (e.g., during coordination system initialization or when less than half of the number of other members are operating as intended). If so, the member determines that that the number of other members does not agree on the token. The member sends a token request message to a designated token distributor in response to the determination. The token request message requests that the designated token distributor establish a new token for the coordination service.

The member receives the new token from the designated token distributor. The member stores the new token in durable storage of the member. The member sends an acknowledgment to the designated token distributor acknowledging receipt of the new token. The member receives a further message from the designated token distributor indicating that more than half of the number of other members has also acknowledged receipt of the new token. The member reintegrates into the coordination service subsequent to installing the new token.

Implementations of the present invention may comprise or utilize a special purpose or general-purpose computer including computer hardware, such as, for example, one or more processors and system memory, as discussed in greater detail below Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the following claims, a "coordination service" is defined as a service for maintaining and/or coordinating state (e.g., metadata) used by software components (e.g., applications and/or services). A coordination service can include a plurality of members that use a consensus mechanism (e.g., algorithm, protocol, etc.) to agree on software component state. Agreed on software component state can be replicated between the plurality of members and stored in durable storage at the plurality of members to increase reliability and availability. In one aspect, members of a coordination service are implemented using Virtual Machines (VMs) in a cloud computing environment. In this aspect, the members use Virtual Hard Drives (VHDs) for durable storage. In another aspect, members of a coordination service are implemented using physical machines. In this other aspect, members use physical storage devices (e.g., hard drives, Solid State Drives (SSDs), etc.) for durable storage.

In general, tokens can be used to identify incarnations of a member set within a coordination service. New token adoption can be achieved through proposal of a new token. When a new token is proposed, members acknowledge acceptance of the new token. To adopt a proposed new token, acknowledgment of the token can be at least majority of members and may be unanimous. That is, at least a majority and potentially all members accept a token before the token is installed.

In one aspect, unanimous adaption of token is achieved executing a distributed transaction with all members of a coordination service participating. Participation by all members helps ensure that all members agree on same token before re-joining the coordination service and accepting requests from clients.

When a member starts and has no token, the member attempts to learn the token from a majority other members. The member requests tokens for all other members and adopts a token that is returned by a majority of the other members. If no such token exists, the member requests a new token.

FIGS. 1A-1C illustrates an example computer architecture 100 for increasing coordination service reliability. Referring to FIG. 1A, computer architecture 100 includes coordination service 101 and applications 111, 112, and 113. Coordination service 101 and applications 111, 112, and 113 can be connected to (or be part of) a network, such as, for example, a Local Area Network ("LAN"), a Wide Area Network ("WAN"), and even the Internet. Accordingly, coordination service 101 and applications 111, 112, and 113 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, coordination service 101 can be configured to maintain state for applications 111, 112, and 113. Applications 111, 112, and 113 can interoperate with one another and can be distributed applications with software components operating on different systems and/or in different locations.

Coordination service 101 further includes token generation service 102 and members 103A, 103B, and 103C. Members 103A, 103B, and 103C have corresponding durable storage 104A, 104B, and 104C respectively. Coordination service 101 can be configured to use active replication or passive replication. Based on configuration, one or more of members 103A, 103B, and 103C can process application commands to generate application state. The application state can be agreed to and/or replicated for storage in durable storage 104A, 104B, and 104C.

Token generation service 102 can be integrated into a member of coordination service 101 or can be a standalone service.

To initiate coordination service 101, members 103A, 103B, and 103C can be started. Upon starting, member 103A may progress more quickly. Member 103A can perform state check 121 to check for a token and application state in durable storage 104A. Since coordination service 101 is being initiated, neither a token nor application state is stored in durable storage 104A.

In response to detecting that neither a token nor application state is stored in durable storage 104A, member 103A sends token query 122 to member 103B and sends token query 123 to member 103C. Token query 122 requests a token from member 103B. Likewise, token query 123 requests a token from member 103C. Members 103B and 103C can check durable storage 104B and 104C respectively for tokens and application state. Since coordination service 101 is being initiated, neither token nor application state is stored in durable storage 104B or in durable storage 104C. As such, members 103B and 103C can return negative acknowledgments 171 and 172 respectively back to member 103A (or depending on their operational status may not respond at all).

In response to negative acknowledgements 171 and 172 or when member 103A otherwise fails to receive a token back in response to token queries 122 and 123, member 103A sends token request 124 to token generation service 102. Token generation service 102 receives token request 124. In response, token generation service 102 generations token 106 and sends token 106 to each of members 103A, 103B, and 103C.

Each of members 103A, 103B, and 103C receive token 106. Members 103A, 103B, and 103C then send acknowledgments 131, 133, and 136 respectively back to token generation service 102 acknowledging token 106 as a new token. Once token generation service 102 has received each of acknowledgments 131, 133, and 136, token generation service 102 knows that each of members 103A, 103B, and 103B have acknowledged token 106 as a new token. Token service 102 then sends messages 132, 134, and 137 respectively (e.g., commit messages) to members 103A, 103B, and 103C. Messages 132, 134, and 137 indicate that each member of coordination service 101 has accepted token 106 as a new token. Members 103A, 103B, and 103C then install token 106 in durable storage 104A, 104B, and 104C respectively. With token 106 installed, coordination service 101 can begin processing state updates for applications 111, 112, and 113.

In one aspect, when a member restarts, a majority of remaining members agree on a token. Turning to FIG. 1B, over time, applications 111, 112, and 113 can submit state updates/commands 143 to coordination service 101. One or more of members 103A, 103B, and 103C can process state updates/commands 143 resulting in state 107. State 107 can be replicated for storage in each of durable storage 104A, 104B, and 104C. During operation, durable storage 104A can lose disk state (e.g., due to a hardware malfunction, due to process reconfiguration within a virtualized environment, etc.) resulting in the loss of token 106 and state 107. In response to the loss of disk state, member 103A can be restarted.

Figure 2:
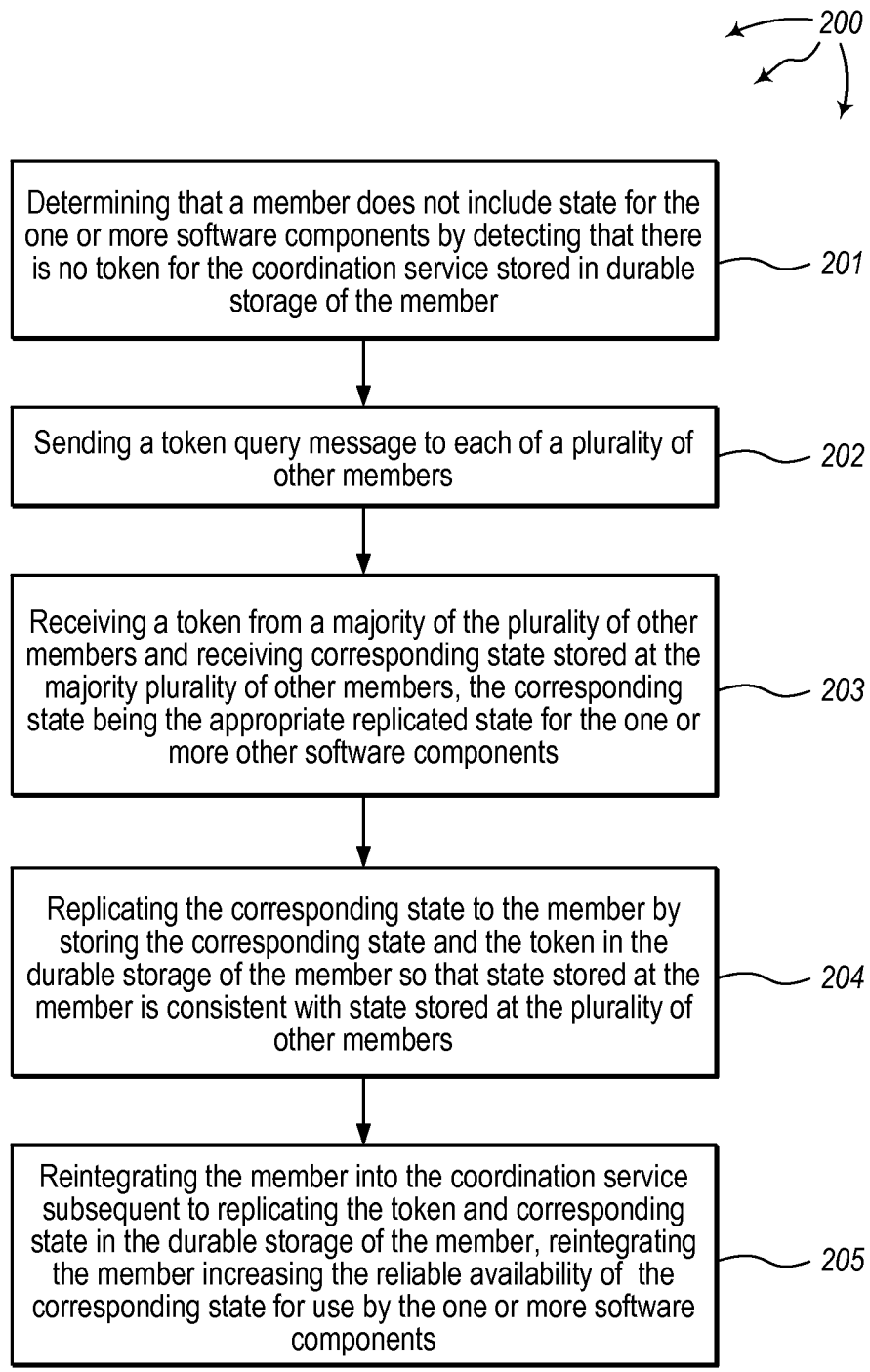
FIG. 2 illustrates a flow chart of an example method for compensating for data loss at a member of a coordination service.

FIG. 2 illustrates a flow chart of an example method 200 for compensating for data loss at a member of a coordination system. Method 200 will be described with respect to the components and data of computer architecture 100 in reference to FIG. 1B.

Method 200 includes an act of determining that a member does not include state for the one or more software components by detecting that there is no token for the coordination service stored in durable storage of the member (201). For example, during restart, member 103A can perform state check 144 on durable storage 104A. Member 103A can determine that durable storage 104A does not include correct state for applications 111, 112, and 113 by detecting that there is no token stored in durable storage 104A. State check 144 can be performed prior to member 103A attempting to rejoin coordination service 101. Thus, detecting lack of a token at member 103A can prevent attempted replication of inconsistent and/or incorrect state from member 103A to other members of coordination service 100.

Method 200 includes sending a token query message to each of a plurality of other members (202). For example, member 103A can send token queries 141 and 142 to members 103B and 103C respectively.

Members 103B and 103C can receive token queries 141 and 142 respectively. In response, each of members 103B and 103C can return token 106 and state 107 to member 103A.

Method 200 includes receiving a token along with corresponding state from a majority of the plurality of other members in response to the token query message, the corresponding state being the appropriate replicated state for the one or more other software components (203). For example, member 103A can receive token 106 and state 107 from member 103B and can receive token 106 and state 107 from member 103C. Receiving token 106 and state 107 from a majority of other members provides assurance to member 103A that state 107 is the correct replicated state for coordination service.

Method 200 includes replicating the corresponding state to the member by storing the corresponding state and the token in the durable storage of the member (204). For example, member 103A can replicate token 106 and state 107 to durable storage 104A. Method 200 includes reintegrating the member into the coordination service subsequent to replicating the corresponding state in the durable storage of the member (205). For example, subsequent to replicating token 106 and state 107 to durable storage 104A, member 103A can reintegrate into coordination service 101. Reintegration of member 103A increases the availability of state 107 (the correct replicated state for coordination service 100) for use by applications 111, 112, and 113.

Accordingly, performing state check 144 in combination with receiving token 106 and state 107 from a majority of other members reduces the risk of member 103A replicating inconsistent and/or incorrect state within coordination service 100. In turn, the risk of errors at applications 111, 112, and 113 due to inconsistent and/or incorrect state being propagated to and exchanged between applications 111, 112, and 113 is also reduced.

In another alternate aspect, when a member restarts, a majority of remaining members do not agree on a token. Turning to FIG. 1C, over time, applications 111, 112, and 113 can submit state updates/commands 146 to coordination service 101. One or more of members 103A, 103B, and 103C can process state updates/commands 146 resulting in state 108. State 108 can be replicated for storage in each of durable storage 104A, 104B, and 104C. During operation, durable storage 104A can lose disk state (e.g., due to a hardware malfunction, process reconfiguration within a virtualized environment, etc.) resulting in the loss of token 106 and state 108. In response to the loss of disk state, member 103A can be restarted.

Similarly, durable storage 104C can also lack (or lose) disk state (e.g., due to a hardware malfunction, due to initialization, due to process reconfiguration within a virtualized environment, etc.) such that durable storage 104C does not include (or has lost) token 106 and state 108. In response to the lack of disk state, member 103C can be (re)started.

Figure 3:
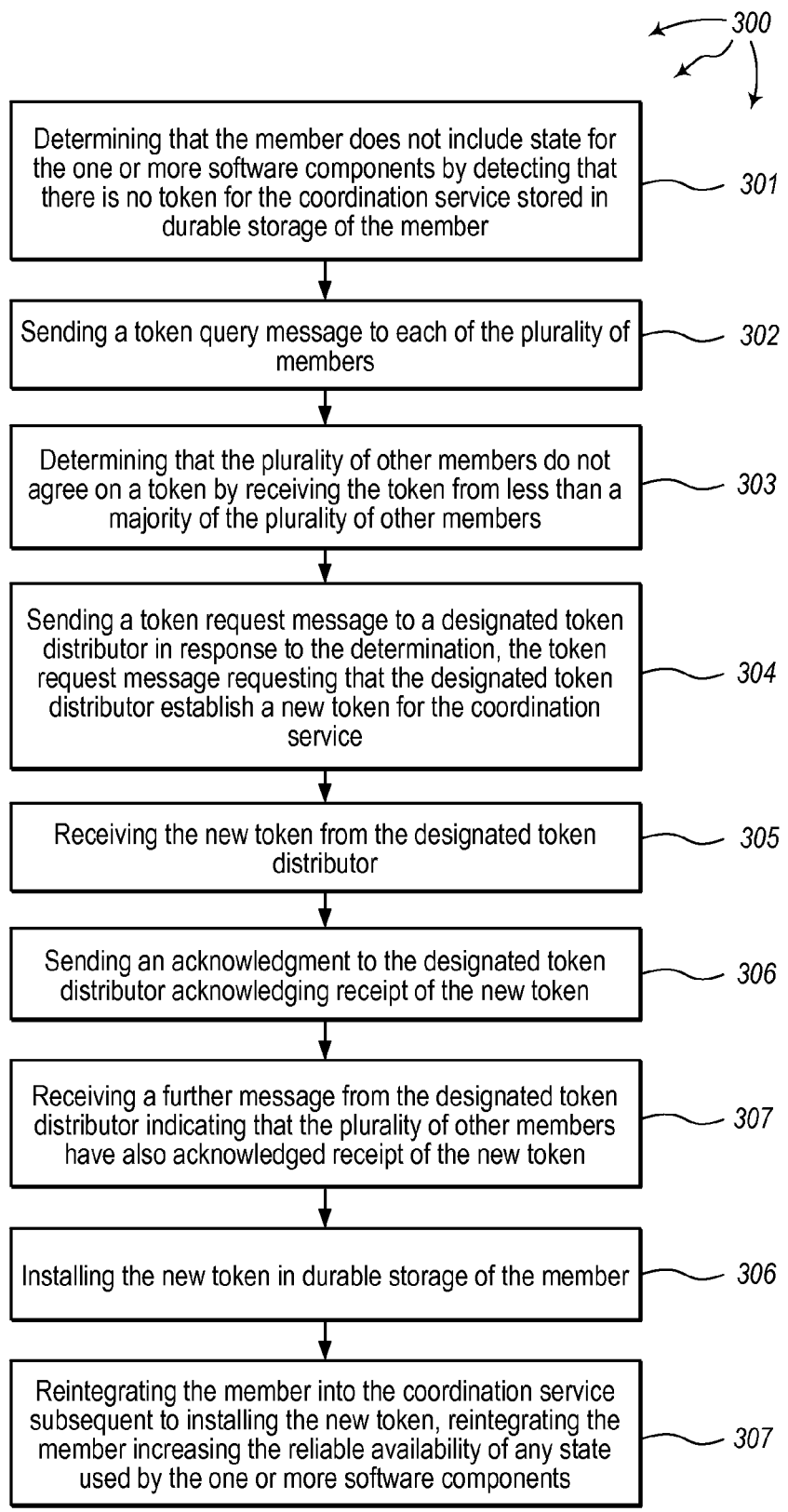
FIG. 3 illustrates a flow chart of an example method for increasing coordination service reliability.

FIG. 3 illustrates a flow chart of an example method 300 for compensating for data loss in a coordination system. Method 300 will be described with respect to the components and data of computer architecture 100 with reference to FIG. 1C.

Method 300 includes determining that the member does not include state for the one or more software components by detecting that there is no token for the coordination service stored in durable storage of the member (301). For example, during restart, member 103A can perform state check 151 on durable storage 104A. Member 103A can determine that durable storage 104A does not include state for applications 111, 112, and 113 by detecting that there is no token stored in durable storage 104A. State check 151 can be performed prior to member 103A attempting to rejoin coordination service 101. Thus, detecting lack of a token at member 103A can prevent attempted replication of incorrect state from member 103A to other members of coordination service 100.

Method 300 includes sending a token query message to each of a plurality of members (302). For example, member 103A can send token queries 152 and 153 to members 103B and 103C respectively.

Members 103B and 103C can receive token queries 152 and 153 respectively. In response, member 103B can return token 106 and state 108 to member 103A. Member 103C can return negative acknowledgement 173 to member 103A (or depending on operational state may not respond at all). Member 103A can receive token 106 and state 108 from member 103B and can receive negative acknowledgement 173 from member 103C.

Method 300 includes determining that the plurality of other members do not agree on a token by receiving the token from less than a majority of the plurality of other members (303). For example, member 103A can determine that members 103B and 103C do not agree on a token since member 103A received token 106 from member 103B and received negative acknowledgement 173 from member 103C. Receiving a token from less than a majority of other members of coordination service 100, indicates to member 103A that member 103A and/or other members may have inconsistent and/or incorrect state and that a recovery process is appropriate, for example, through initiation of a new token protocol. Method 300 includes sending a token request message to a designated token distributor in response to the determination, the token request message requesting that the designated token distributor establish a new token for the coordination service (304). For example, member 103A can send token request 154 to token generation service 102 to establish a new token for coordination service 101. Token generation service 102 can receive token request 154. In response, token generation service 102 generations token 109 and sends token 109 to each of members 103A, 103B, and 103C.

Method 300 includes receiving the new token from the designated token distributor (305). For example, member 103A can receive token 109 from token generation service 102. Similarly, members 103B and 103C can also receive token 109 from token generation service 102.

Method 300 includes sending an acknowledgment to the designated token distributor acknowledging receipt of the new token (306). For example, member 103A can send acknowledgment 161 to token generation service 102. Similarly, members 103B and 103C can send acknowledgments 162 and 163 respectively to token generation service 102.

Once token generation service 102 has received each of acknowledgments 161, 162, and 163, token generation service 102 knows that each of members 103A, 103B, and 103C have acknowledged token 109 as a new token. Token service 102 then sends messages 164, 166, and 167 respectively (e.g., commit messages) to members 103A, 103B, and 103C. Messages 164, 166, and 167 indicate that each of members 103A, 130B, and 103C have accepted token 109 as a new token for coordination service 101.

Method 300 includes receiving a further message from the designated token distributor indicating that the plurality of other members have also acknowledged receipt of the new token (307). For example, member 103A can receive message 164 indicating that members 103B and 103C have also acknowledged receipt of token 109. Similarly, member 103B can receive message 166 indicating that members 103A and 103C have also acknowledged receipt of token 109. Likewise, member 103C can receive message 167 indicating that members 103A and 103B have also acknowledged receipt of token 109.

Method 300 includes installing the new token in durable storage of the member (308). For example, member 103A can install token 109 in durable storage 104A. Similarly, members 103B and 103C can install token 109 in durable storage 104B and 104C respectively.

Method 300 includes reintegrating the member into the coordination service subsequent to installing the new token (309). For example, subsequent to installing token 109 to durable storage 104A, member 103A can reintegrate into coordination service 101. Similarly, subsequent to installing token 109 to durable storage 104C, member 103C can reintegrate into coordination service 101. Reintegrating members 103A and 103C increases the locations where state for applications 111, 112, and 113 can be replicated. In turn, availability of the state is increased if subsequent malfunctions occur.

Accordingly, performing state check 151 in combination with adoption of token 109 reduces the risk of members of coordination service 100 replicating inconsistent and/or incorrect state within coordination service 100. In turn, the risk of errors at applications 111, 112, and 113 due to inconsistent and/or incorrect state being propagated to and exchanged between applications 111, 112, and 113 is also reduced.

As described, when state loss is detected (e.g., no majority holds a token) in a coordination system, any stored state is potentially inconsistent. For example, in FIG. 1C, state 108 is potentially inconsistent. State loss can be handled in any number of different ways. One option is to wipe the potentially inconsistent state and restart (effectively reinitializing the coordination system). For example, state 108 can be wiped for durable storage 104B.

Another option is to select the most recent state from the processes that still have state. For example, state 108 can be selected for replication to members 103A and 103B. As the number of members in a coordination service increases, there is increased potential for members to have different state. When members have different state, a further option is to arbitrarily select one of the different states for replication. An additional option is to have a special transaction which is replicated to all members in a coordination service. The special transaction inserts a "marker" into the state at each member. A member can roll back to the "marker" when state loss is detected for the coordination service.

Various protocols including a token query protocol and a token generation protocol can be used to facilitate aspects of the invention.

A token query protocol can include:
1. Upon start, a member r sends TokenQuery messages, one to each of the other members.
2. Upon receiving a TokenQuery message, each other member s responds with an acknowledgment containing its current token T.
3. Upon receiving token T from a majority of other members s, member r installs token T.
4. If no majority has a token, member r notifies the token generator.

As described, a token acknowledgement in the token query protocol can also carry state from the acknowledging member. The acknowledgment can contain a whole snapshot from the acknowledging member. Alternatively, the querying member pulls a snapshot from an acknowledging member. When the snapshot is installed, the querying member can resume operation.

A token generation protocol can include:
1. A token generator g proposes a new token T' by sending the new token T' to all members h.
2. Upon receiving proposed new token T', each member h stops processing state updates and accepts new token T' by acknowledging new token T' to token generator g.
3. Upon receiving an acknowledgement of new token T' from every member h, send a commit T' message to every member h.
4. At each member h, upon receiving a commit message for T', install T'.

As described, while querying for a token or after receiving a new token proposal, a member stops responding to regular operations of a coordination service. When querying for a token, the member can resume when the token is installed. When receiving a new token proposal, the member can resume when the new token is committed.

Figure 4:
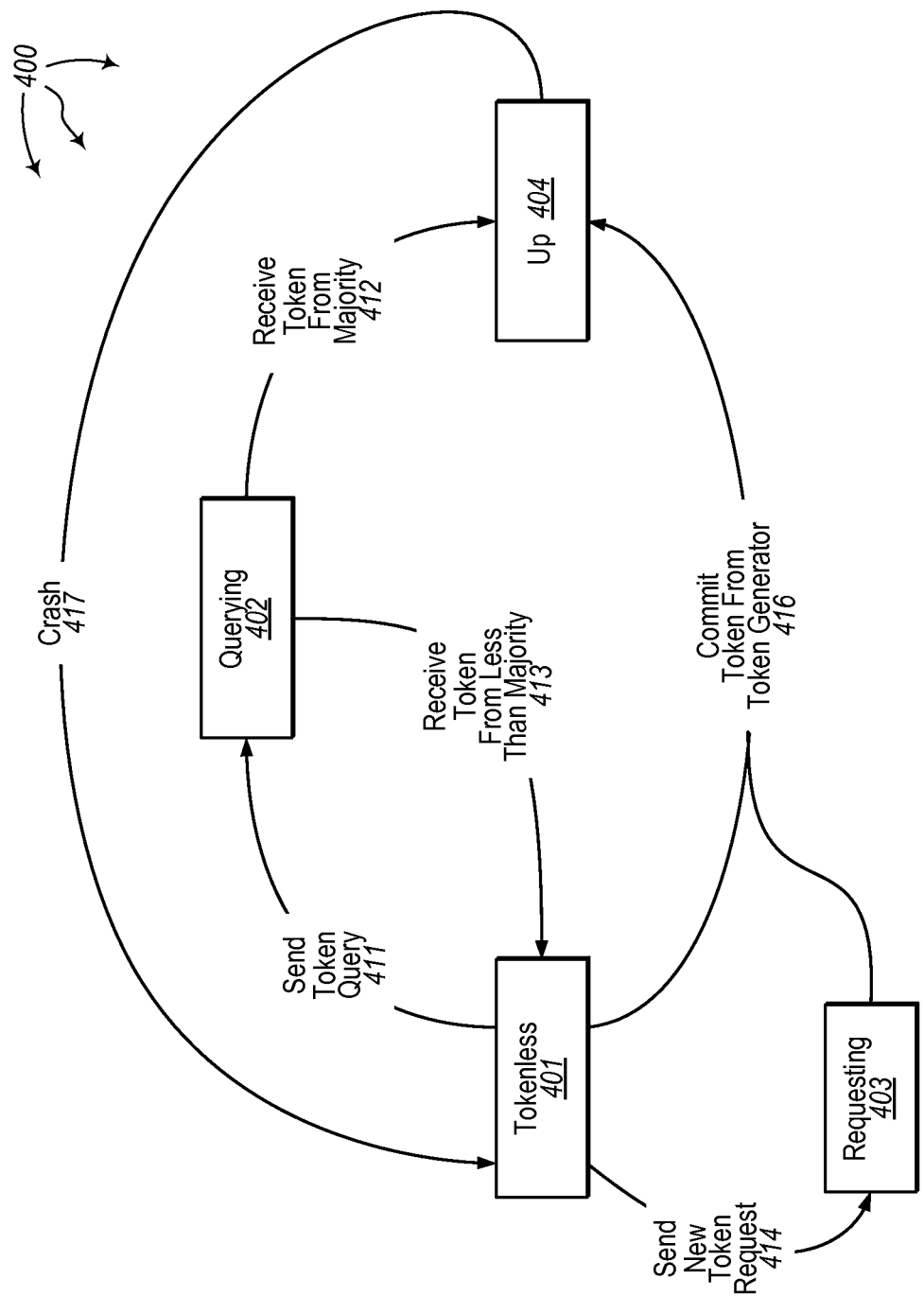
FIG. 4 illustrates a state diagram for a member of a coordination service.

FIG. 4 illustrates a state diagram 400 for a member of a coordination service. Upon start or restart, the state of the member is tokenless 401. When the state of the member is tokenless 401, sending 411 a token query to a plurality of other members transitions the state of the member to querying 402. When the state of the member is querying 401 and a token is received 412 from a majority of other members, the state of the member transitions to up 404. On the other hand, when the state of the member is querying 401 and a token is received 413 from less than a majority 413 of other members, the state of the member transitions to tokenless 401.

When the state of the member is tokenless 401 and the member sends 414 a new token request to a token generation, the state of the member transitions to requesting 403. When the state of the member is tokenless 401 and the member commits 416 a token from the token generator, the state of the member transitions to up 404. Similarly, when the state of the member is requesting 403 and the member commits 416 a token from the token generator, the state of the member transitions to up 404. When the state of the member is up 404 and the member crashes 417, the state of the member transitions to tokenless 401.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
one or more processors;
system memory coupled to the one or more processors, the system memory storing instructions that are executable by the one or more hardware processors;
the computer system participating along with one or more other computer systems to form a plurality of members of a coordination service;
the one or more hardware processors configured to execute the instructions stored in the system memory to compensate for state loss in the coordination service, including the following:
determine that the computer system does not include state for one or more software components by detecting that there is no token for the coordination service stored in durable storage of the computer system;
replicate corresponding state for the one or more software components to the computer system by storing the corresponding state and installing a new token for the coordination service in durable storage at the computer system, the corresponding state also stored at one or more other members of the coordination service, the new token received from the one or more other members of the coordination service; and
reintegrate the computer system into the coordination service subsequent to installing the token and storing the corresponding state in the durable storage at the computer system, reintegrating the computer system increasing the reliable availability of the corresponding state for use by the one or more software components.

2. The computer system of claim 1, wherein the computer system is run in a corresponding Virtual Machine (VM) and wherein durable storage at the computer system is provided by Virtual Hard Drives (VHDs).

3. The computer system of claim 1, wherein the one or more hardware processors configured to execute the instructions stored in the system memory to replicate corresponding state for the one or more software components to the computer system comprises the one or more hardware processors configured to execute the instructions stored in the system memory to access a snapshot of the corresponding state from one or more other of the plurality of members.

4. At a computer system, the computer system participating along with one or more other computer systems to form a plurality of members of a coordination service, a method for compensating for state loss in the coordination service, the method comprising:
determining that the computer system does not include state for one or more software components by detecting that there is no token for the coordination service stored in durable storage of the computer system, the one or more software components coordinated by the coordinating service;
replicating corresponding state for the one or more software components at the computer system by storing the corresponding state and installing a new token for the coordination service in the durable storage of the computer system, the corresponding state stored at one or more other members of the coordination service, the new token received from the one or more other members; and
reintegrating the computer system into the coordination service subsequent to installing the new token and storing the corresponding state in the durable storage of the computer system, reintegrating the computer system increasing the reliable availability of the corresponding state for use by the one or more software components.

5. The method of claim 4, wherein the computer system is running on a Virtual Machine (VM) in a cloud computing environment.

6. The method of claim 5, wherein determining that the computer system does not include state for one or more software components comprises detecting that there is no token stored in a Virtual Hard Drive (VHD) used by the computer system.

7. The method of claim 6, wherein replicating the corresponding state at the computer system comprises storing the token and corresponding state in the Virtual Hard Drive (VHD).

8. The method of claim 5, further comprising sending a token query message to one or more of the plurality of members of the coordination service by sending a token query to a plurality of other Virtual Machines (VMs) in the cloud computing environment.

9. The method of claim 4, wherein the one or more software components are distributed applications.

10. The method of claim 4, wherein replicating the corresponding state comprises access a snapshot of the corresponding state from one or more of the plurality of members of the coordination service.

11. The method claim 4, further comprising preventing the computer system from responding to regular operations of the coordination service in response to detecting that there is no token for the coordination service stored in durable storage of the computer system.

12. The method of claim 4, wherein reintegrating the computer system into the coordination service comprises resuming responding to regular operations of the coordination service.

13. At a computer system, the computer system participating along with one or more other computer systems to form a plurality of members of a coordination service, the coordination service used to store state for one or more other software components, the plurality of other members using a consensus mechanism to agree on state for the one or more other software components, a method for increasing reliability of the coordination service, the method comprising:
determining that the computer system does not include state for the one or more software components by detecting that there is no token for the coordination service stored in durable storage of the computer system;
determining that other members from among the plurality of members do not agree on a token;
receiving a new token for the coordination service from a designated token distributor; and
reintegrating the computer system into the coordination service by installing the new token in durable storage at the computer system, reintegrating the computer system increasing the reliable availability of any state used by the one or more software components.

14. The method of claim 13, wherein the computer system is running on a Virtual Machine (VM) in a cloud computing environment.

15. The method of claim 14, wherein determining that the computer system does not include state for the one or more software components comprises detecting that there is no token stored in a Virtual Hard Drive (VHD) used by the computer system.

16. The method of claim 15, wherein installing the new token in durable storage of the computer system comprises installing the new token in the Virtual Hard Drive (VHD) used by the computer system.

17. The method of claim 13, wherein determining that the other members from among the plurality of members do not agree on a token comprises receiving a negative acknowledgment of a token query message from at least one of the other members.

18. The method of claim 13, further comprising sending a token request message to the designated token distributor by sending a token request to a token distributor integrated into one of the plurality of members.

19. The method claim 13, further comprising preventing the computer system from responding to regular operations of the coordination service in response to detecting that there is no token for the coordination service stored in durable storage of the computer system.

20. The method of claim 13, wherein reintegrating the computer system into the coordination service comprises resuming responding to regular operations of the coordination service.

21. The computer system of claim 1, further comprising the one or more hardware processors configured to execute the instructions stored in the system memory to receive the new token from a majority of the members of the coordination service, receiving the token from the majority of the members indicating consensus among the plurality of members with respect to the corresponding state.

22. The computer system of claim 1, further comprising the one or more hardware processors configured to execute the instructions stored in the system memory to:
determine that other members from among the plurality of members do not agree on a token; and
receive the new token from a designated token distributor.

23. A computer system, the computer system comprising:
one or more processors;
system memory coupled to the one or more processors, the system memory storing instructions that are executable by the one or more hardware processors;
the computer system participating along with one or more other computer systems to form a plurality of members of a coordination service;
the one or more hardware processors configured to execute the instructions stored in the system memory to compensate for state loss in the coordination service, including the following:
determine that the computer system does not include state for the one or more software components by detecting that there is no token for the coordination service stored in durable storage of the computer system;
determine that other members from among the plurality of members do not agree on a token;
receive a new token for the coordination service from a designated token distributor; and
reintegrate the computer system into the coordination service by installing the new token in durable storage at the computer system, reintegrating the member increasing the reliable availability of any state used by the one or more software components.

24. The computer system of claim 23, further comprising the one or more hardware processors configured to execute the instructions stored in the system memory to send a token request message to the designated token distributor in response to the determination that other members from among the plurality of members do not agree on a token, the token request message requesting that the designated token distributor establish the new token for the coordination service.

25. The computer system of claim 23, further comprising the one or more hardware processors configured to execute the instructions stored in the system memory to, prior to reintegrating the computer system into the coordination service, receiving a further message from the designated token distributor indicating that other of the plurality of members have acknowledged receipt of the new token.

26. The computer system of claim 23, further comprising the one or more hardware processors configured to execute the instructions stored in the system memory to prevent the computer system from responding to regular operations of the coordination service in response to detecting that there is no token for the coordination service stored in durable storage of the computer system.

27. The computer system of claim 24, wherein the one or more hardware processors configured to execute the instructions stored in the system memory to reintegrate the computer system into the coordination service comprises the one or more hardware processors configured to execute the instructions stored in the system memory to resume responding to regular operations of the coordination service.

* * * * *